United States Patent Office 2,770,259
Patented Nov. 13, 1956

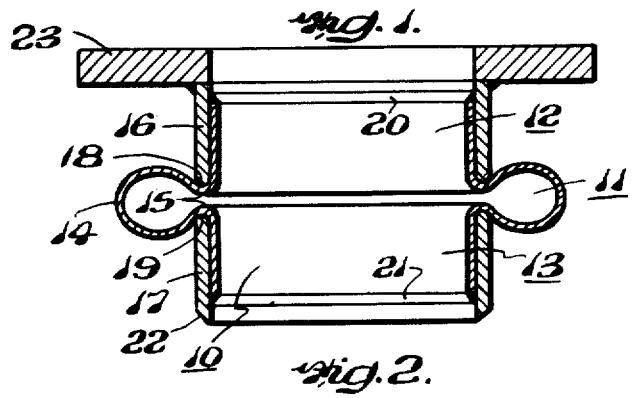
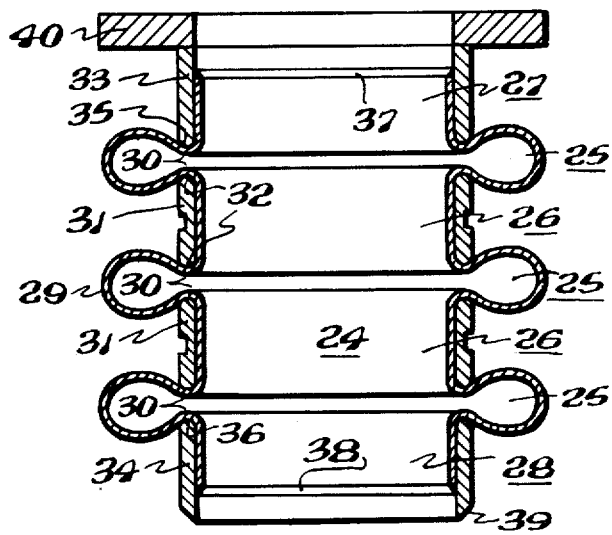
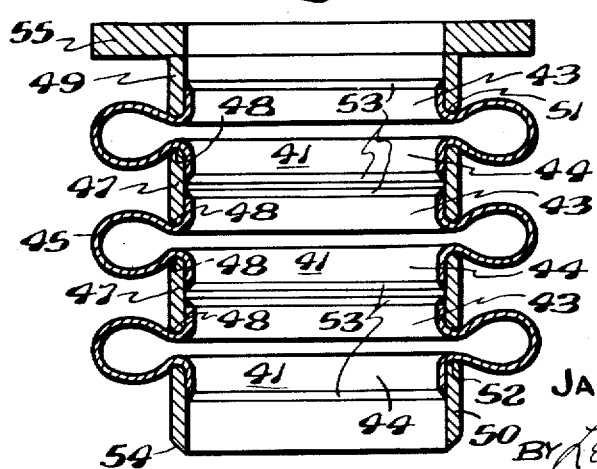
INVENTOR.
JAMES P. ZALLEA
ATTORNEY

2,770,259

EXPANSION JOINT AND APPARATUS FOR AND METHOD OF MAKING SAME

James P. Zallea, Wilmington, Del.

Application July 12, 1952, Serial No. 298,572

2 Claims. (Cl. 138—52)

This invention relates generally to expansion joints and more particularly to expansion joints having a bellows element of an improved form, it being among the principal objects of the present invention to provide the bellows element with one or more corrugations each of which is of ovaloid cross section and so disposed in the joint as to present its major axis normal to the axis of the joint.

Still another object of the present invention is to provide an expansion joint having a plurality of similar bellows elements each with one or more annular corrugations as above mentioned to insure therefor a substantially uniform predetermined flexing life.

Other objects and advantages of the present invention will appear more fully hereinafter it being understood that the specific embodiments of the invention described herein are illustrative only and that modifications thereof falling within the scope of the appended claims will be apparent to persons skilled in the art to which this invention pertains.

In the accompanying drawings:

Figure 1 is a sectional view of an expansion joint having a single corrugation bellows elements constructed in accordance with and embodying the principles of the present invention;

Figure 2 is a sectional view of a modified construction of the joint wherein the bellows element is provided with a plurality of corrugations to form a multiple corrugation type of expansion joint; and Figure 3 is a sectional view of a modified construction of expansion joint of the multiple corrugation type formed of a plurality of one-piece bellows elements each having a single annular corrugation formed in accordance with the present invention.

An expansion joint which is provided with annular corrugations each having a substantially circular cross section is known to be ideal for use in pipe lines or the like which are subject to high internal pressures, the reason being that in the corrugations of such expansion joints the stresses which are due to internal pressure alone are relatively low. However, the disadvantage of such expansion joints is that the bending stresses due to flexing are relatively high and therefore limit the magnitude of the flexings or their number.

It is likewise known that an expansion joint provided with annular corrugations each having a conventional U-shaped cross section is superior to the aforementioned type of expansion joint for use in pipe lines or the like which are subject to relatively low internal pressures, the reason being that the bending stresses in corrugations of this latter type which are due only to flexing of the corrugations of the expansion joint are relatively low. However, the disadvantage of the U-shaped corrugation is that the stresses due to pressure are relatively high and so limit the joint to relatively low pressure applications.

Now since the life of an expansion joint of either of the aforementioned types is dependent upon the magnitude of the combined pressure and bending stress such as are induced in the corrugations thereof by any pressure internally applied to the joint and by any axial compression or elongation thereof, it follows that the ideal expansion joint is one which is provided with modified corrugations which afford both the advantage of the low stress induced by pressure in an expansion joint of the one type and the advantage of the low stress induced by flexing of the corrugations in an expansion joint of the other type.

The present invention provides an ideal expansion joint, such a joint being one provided with one or more corrugations having an ovaloid cross section the major axis of which extends normal to the axis of the expansion joint. Such corrugations withstand a greater number of flexings than either of the unmodified forms, the internally applied pressure and the magnitude of the flexings being equal. In addition, such corrugations withstand flexings of greater magnitude than either of the unmodified forms, the internally applied pressure and the number of flexings being equal.

Referring particularly to Figure 1, the expansion joint constructed in accordance with and embodying the present invention includes a bellows element, generally designated by the numeral 10, that is made from a cylindrical shell or blank which is hydraulically bulged to provide the same with an annularly corrugated portion 11. Integral with the latter and disposed on opposite sides thereof are a pair of tubular opposite end portions of the blank, designated respectively by the numerals 12 and 13, which are axially aligned with the annularly corrugated portion 11.

In radial cross section the annularly corrugated portion 11 has an outer ovaloid part 14 entirely concave to the interior of the bellows element and disposed with its major axis normal to the longitudinal axis of the blank, and inner curved parts 15—15 entirely convex to the interior of the bellows element and joining the opposite sides of the ovaloid part 14 respectively to the oppositely extending axially aligned tubular portions 12 and 13.

For securing the bellows element 10 in a pipe line, its tubular portions 12 and 13 are respectively provided with oppositely extending nipple members 16 and 17. These members are respectively provided with rounded circumferential edges 18 and 19 which more or less snugly nest in the curved convex parts 15—15 the members being secured to the tubular portions 12 and 13 by any conventional form of welding or brazing, as by lap welding, shown at 20 and 21. The outer free ends of the nipple members 16 and 17 are adapted to be secured directly into a pipe line, e. g., by beveling an end, as at 22, for welding it into a pipe line, or by suitably securing thereto a bolting flange as at 23. It will be understood, of course, that both opposite ends of the joint may be provided with welding ends such as that designated 22 or with bolting flanges such as designated 23. The expansion joint described hereinabove is provided with a single bellows element having only one annular corrugation of the modified type with which the present invention is concerned. However, an expansion joint having a plurality of such corrugations is within the purview of the present invention.

Referring particularly to Figure 2, the modified expansion joint constructed in accordance with and embodying the principles of the present invention includes a bellows element, generally designated by the numeral 24, that is made from a cylindrical shell or blank which is hydraulically bulged to provide the same with a plurality of annularly corrugated portions 25. Between each adjacent pair of the latter is an integral tubular portion of the blank, designated by the numeral 26, and extending in opposite directions from the remote pair of the annularly corrugated portions 25 are a pair of integral tubular opposite end portions of the blank, designated respectively by the numerals 27 and 28. The several annularly corrugated portions 25 and the several tubular blank portions 26, 27 and 28 are axially aligned.

In radial cross section each annularly corrugated portion 25 is the same as the annularly corrugated portion 11 of the bellows element 10, being provided with an outer ovaloid part 29 that is disposed with its major axis normal to the longitudinal axis of the blank, and curved parts 30—30 that join the opposite sides of the ovaloid part 29 respectively to the adjacent oppositely extending axially aligned tubular blank portions.

Embracing the axially spaced tubular blank portions 26—26 respectively are a pair of cylindrical reinforcing collars 31—31, each of which has oppositely facing circumferential edges rounded as at 32—32 and more or less snugly nested respectively in the associated curved convex parts 30—30.

For securing the bellows element 24 in a pipe line, its tubular portions 27 and 28 are respectively provided with oppositely extending nipple members 33 and 34. These members are respectively provided with rounded circumferential edges 35 and 36 which more or less snugly nest respectively in the associated curved convex parts 30—30, the members being secured to the tubular portions 27 and 28 by any conventional form of welding or brazing, as by lap welding, shown at 37 and 38. The outer free ends of the nipple members 33 and 34 may be prepared for securement into a pipe line as described hereinabove in the case of the nipple members 16 and 17. As shown, the nipple member 34 is provided with a welding end 39, and the nipple member 33 is fitted with a bolting flange 40.

The expansion joint just described is provided with a single bellows element having a plurality of annular corrugations of the modified type with which the present invention is concerned. However, an expansion joint having a plurality of bellows elements each with one, or even more, of such corrugations is within the purview of the present invention.

Referring particularly to Figure 3, another modified expansion joint constructed in accordance with and embodying the principles of the present invention includes a plurality of bellows elements 41 that are disposed in axially spaced axially aligned relation. These bellows elements are similar in every respect to the bellows element 10, described hereinabove, each being provided with a single annular corrugation 42 and oppositely extending tubular blank portions 43 and 44. The outer ovaloid part of the annular corrugation 42 is designated by the numeral 45, while the inner curved parts are designated by the numerals 46—46.

Embracing the opposed axially spaced tubular blank portions 43 and 44 respectively of each pair of adjacent bellows elements 41—41, are cylindrical reinforcing collars 47, each of which has oppositely facing circumferential edges rounded as at 48—48 and more or less snugly nested respectively in the associated curved convex parts 46—46.

For securing the expansion joint in a pipe line, the outer tubular portions 43 and 44 respectively of the remote bellows elements are respectively provided with oppositely extending nipple members 49 and 50. These members are respectively provided with rounded circumferential edges 51 and 52 which more or less snugly nest respectively in the associated curved convex parts 46—46. The several bellows elements, reinforcing collars and nipple members are secured together by any conventional form of welding or brazing, as by lap welding, shown at 53. The outer free ends of the nipple members 49 and 50 may be prepared for securement into a pipe line as described hereinabove in the case of the nipple members 16 and 17. As shown, the nipple member 50 is provided with a welding end 54, and the nipple member 49 is fitted with a bolting flange 55.

The principles of the present invention will be better understood by a consideration of the following factors which bear directly on the practical application thereof. When a bellows element is provided with the conventional U-type corrugation, the stresses due to internally applied pressure increase as the diameter of the bellows element increases even though the thickness and shape of the corrugation are held constant. This is shown by the fact that the root of the corrugation, or that part thereof which is convex to pressure, will collapse at decreasingly lower internally applied pressures as the diameter of the bellows element increases.

Consequently, the present invention is a solution to the problem of making large expansion joints because the root of the corrugation is adequately supported against internally applied pressure at all times and because that part of the corrugation which is subject to internally applied pressure and which is not supported thereagainst is concave.

To provide a bellows element with an annular corrugation by internally applied fluid presure the magnitude of the latter must be sufficient to stress the material of the bellows element beyond its elastic limit. It follows, therefore, that if the operating pressure for which the bellows element is designed bears the same relationship to the internally applied bulging pressure as the endurance limit bears to the elastic limit of the bellows material, the desired operating pressure will not stress the bellows material beyond its endurance limit.

When the bending stresses due to flexing of the corrugation are to be low, a bulging pressure preferably three times the operating pressure is sufficient. However, for reasons of economy, it is sometimes desirable to increase the permissible movement per corrugation of the expansion joint, thus increasing the bending stresses which are incident thereto. In this event, a corresponding decrease in the stresses due to pressure alone is desired. This is effected by increasing the bulging pressure to preferably five times the operating pressure. The increased pressure, of course, imparts to the annular corrugation a cross section more nearly approaching a circle in form, and since this type of corrugation is ideal for withstanding high internal pressures, the low stresses induced therein by pressure alone tend to balance the increased stresses due to the increased permissible movement per corrugation.

When the annular corrugation with which the bellows element is provided is substantially circular in cross section, the stress therein due to internally applied pressure is approximately $$Sp = \frac{PR}{T}$$

wherein P is the internally applied pressure R, is the radius of the corrugation and T is the thickness of the metal. The bulging pressure $Pb$ required to form such a corrugation is approximately $$\frac{SyT}{R}$$

wherein $Sy$ is the yield strength of the metal. Consequently, assuming that a bellows element is made of metal having a yield strength Sy of 45,000 p. s. i. and a thickness T of .05 inch and that the bellows element is to be provided with an annular corrugation having a radius R of 1½ inches, the bulging pressure $Pb$ required to form such a bellows element is 1,500 p. s. i. If the bending stress is kept low, such a joint might be found to be good for 500,000 flexings at an operating pressure varying from 0 to 300 p. s. i. This is a ratio of bulging pressure to operating pressure of 5 to 1.

Now if a bellows element of the same metal and of the same thickness is provided with an annular corrugation having the modified form with which this invention is concerned, the same life of 500,000 flexings or better can be expected if the same ratio of bulging pressure to operating pressure is maintained.

It will be understood, of course, that the present invention as hereinbefore described and as shown in the accompanying drawings is susceptible of various changes and modifications which may be made from time to time without departing from the general principles or real spirit of the invention, and accordingly it is intended to claim the same broadly, as well as specifically, as indicated by the appended claims.

What is claimed as new and useful is:

1. In an expansion joint for a pipe line or the like, a unitary bellows element of hollow toroidal shape formed of a tubular blank to have permanently formed an annular central wall part of generally ovaloid shape in transverse section, said ovaloid part being concave to any internal pressure to which the joint may be subjected and having major and minor axes of which the major axis extends normal to the axis of said bellows element, said annular central wall part being transversely curved through an arc substantially greater than 180 degrees and terminating at opposite sides thereof in a pair of axially spaced annular side wall parts which define therebetween a relatively narrow opening extending circumferentially about the annular base of said central wall part, and side wall parts being each similarly curved reversely throughout with respect to the curvature of said central part and thus convex to said internal pressure, the reversely curved side wall parts providing respectively on opposite sides of the central wall part of the bellows element a pair of oppositely presenting annular indentations equally spaced radially from the central longitudinal axis of the bellows element, the said indentations being each of a same radius substantially less than that of any portion of the central wall part, the opposite sides of said annular central wall part of the bellows element and said reversely curved side wall parts thereof being symmetrically disposed with reference to the median plane of the element extending normal to the axis thereof, said reversely curved side wall parts being respectively provided with axially alined tubular extremities of equal diameter at opposite sides of said main central wall part, means snugly fitted in the indentations formed by said reversely curved side wall parts of said bellows element and extending axially from opposite sides thereof in embracing relation to said tubular extremities for reinforcing and supporting said side wall parts against deformation under the influence of said internal pressure, while permitting said central part to flex freely upon expansion and contraction of said joint, and means for securing said reinforcing and supporting means respectively to said tubular extensions, said securing means being spaced axially from said reversely curved side wall parts, said bellows element being further characterized in that the transversely curved central wall part and the reversely curved side wall parts thereof are formed of continuously homogeneous metal entirely free of any circumferentially extending welds.

2. In an expansion joint for a pipe line or the like, a plurality of hollow toroid-shaped unitary bellows elements formed of tubular stock so that each of said elements has permanently formed an annular central wall part of generally ovaloid form which extends in transverse section through an arc substantially greater than 180 degrees, said ovaloid part having major and minor axes of which the major axis extends normal to the axis of said bellows element and terminating at opposite sides thereof in a pair of axially spaced oppositely disposed annular side wall parts which in transverse section are curved reversely throughout with respect to the curvature of said main central wall part to define therebetween a relatively narrow opening extending circumferentially about the annular base of said main central wall part, all said parts of each bellows element being symmetrically disposed in relation to the median plane of the element extending normal to the axis thereof, the main central wall part of each bellows element being concave to said internal pressure while the reversely curved side wall parts thereof are convex to said pressure, the reversely curved side wall parts providing respectively on opposite sides of the central wall part of the bellows element a pair of oppositely presenting annular indentations equally spaced radially from the central longitudinal axis of the bellows element, the said indentations being each of a same radius substantially less than that of any portion of the central wall part, said reversely curved side wall parts being respectively provided with axially alined tubular extremities of equal diameter at opposite sides of said main central wall part, and a plurality of tubular sleeves disposed alternately with respect to said bellows elements in coaxial alinement therewith, each adjoining pair of said bellows elements having one of said sleeves extending therebetween to commonly embrace the proximate tubular extremities of each said adjoining pair of bellows elements, the ends of said sleeves in immediate proximity to said bellows elements having edges which are shaped complementally to the transverse curvature of said indentations and are snugly accommodated therein, said sleeves being adapted to support the reversely curved side wall parts of the bellows elements against deformation under the influence of said internal pressure and to permit freedom of movement of the main central wall parts of the bellows elements when the latter are alternately expanded and contracted, and means for securely retaining in each of said indentations the complementally shaped end of the sleeve snugly accommodated therein, said securing means being in each instance spaced axially from said reversely curved side wall parts, each of said bellows elements being further characterized in that the transversely curved main central wall part and the reversely curved side wall parts thereof are formed of continuously homogeneous metal entirely free of any circumferentially extending welds.

References Cited in the file of this patent

UNITED STATES PATENTS

| Number | Name | Date |
|---|---|---|
| 773,046 | Bayles | Oct. 25, 1904 |
| 1,698,210 | Bezzenberger | Jan. 8, 1929 |
| 1,946,472 | Babcock | Feb. 13, 1934 |
| 2,050,227 | Mantle | Aug. 4, 1936 |
| 2,106,495 | Debor | Jan. 25, 1938 |
| 2,223,691 | Lockwood | Dec. 3, 1940 |
| 2,352,038 | Tolke | June 20, 1944 |
| 2,445,484 | Kopperman | July 20, 1948 |
| 2,489,844 | Zallea et al. | Nov. 29, 1949 |
| 2,495,059 | Grant | Jan. 17, 1950 |
| 2,592,372 | Altorfer | Apr. 8, 1952 |
| 2,631,640 | Zallea | Mar. 17, 1953 |
| 2,699,959 | Zallea | Jan. 18, 1955 |

FOREIGN PATENTS

| Number | Country | Date |
|---|---|---|
| 191,911 | Switzerland | Dec. 1, 1937 |
| 708,598 | France | May 4, 1931 |

UNITED STATES PATENT OFFICE
CERTIFICATE OF CORRECTION

Patent No. 2,770,259 November 13, 1956

James P. Zallea

It is hereby certified that error appears in the above numbered patent requiring correction and that the said Letters Patent should read as corrected below.

Column 5, line 26, for "and" read -- said --.

Signed and sealed this 8th day of October 1963.

(SEAL)
Attest:

ERNEST W. SWIDER
Attesting Officer

EDWIN L. REYNOLDS
Acting Commissioner of Patents